United States Patent
Hirsh

(10) Patent No.: US 9,621,582 B1
(45) Date of Patent: Apr. 11, 2017

(54) GENERATING PHARMING ALERTS WITH REDUCED FALSE POSITIVES

(71) Applicant: EMC Corporation, Hopkinton, MA (US)

(72) Inventor: Mirit Hirsh, Oranit (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 169 days.

(21) Appl. No.: 14/102,770

(22) Filed: Dec. 11, 2013

(51) Int. Cl.
*H04L 29/06* (2006.01)

(52) U.S. Cl.
CPC .................. *H04L 63/1483* (2013.01)

(58) Field of Classification Search
CPC .................. H04L 63/1483; G06F 21/55
USPC .......................... 726/2, 24–25, 22
See application file for complete search history.

(56) References Cited

U.S. PATENT DOCUMENTS

| 6,728,767 | B1 * | 4/2004 | Day et al. .................. 709/223 |
| 8,245,304 | B1 | 8/2012 | Chen et al. |
| 2007/0174630 | A1 | 7/2007 | Shannon et al. |
| 2008/0060054 | A1 | 3/2008 | Srivastava |
| 2009/0055928 | A1 * | 2/2009 | Kang et al. .................. 726/22 |
| 2009/0208020 | A1 | 8/2009 | Grynberg |
| 2014/0282816 | A1 * | 9/2014 | Xie et al. .................. 726/1 |

OTHER PUBLICATIONS

RSA Data Sheet, "RSA Fraudaction (TM) Anti-Phishing Service," EMC Corporation, (c) 2012, 2 pages.

* cited by examiner

*Primary Examiner* — Hadi Armouche
*Assistant Examiner* — Angela Holmes
(74) *Attorney, Agent, or Firm* — BainwoodHuang

(57) ABSTRACT

A technique for informing an Internet site operator of potential pharming attacks includes generating pharming alerts based on mismatches between a set of expected IP addresses and IP addresses obtained from DNS servers on the Internet and filtering the generated alerts based on circumstances surrounding the generated pharming alerts. Filtering the alerts blocks less suspect pharming alerts while allowing more suspect ones to pass to the site operator, reducing the rate of false positives and better enabling the operator to focus on alerts that may present actual threats.

19 Claims, 5 Drawing Sheets

| Alert # | Expected IP Range | Expected Hosting Company | Ret'd IP Address | Ret'd IP Hosting Company | DNS NAME | Blocked / Allowed |
|---|---|---|---|---|---|---|
| 1 | 68.124.97.000 To 68.124.97.255 | BIG DOMS, INC. | 68.124.57.113 (Add) | BIG DOMS, INC. | ns1.bigserver.net | Blocked |
| 2 | 68.124.97.000 To 68.124.97.255 | BIG DOMS, INC. | 68.124.57.111 (Add) | BIG DOMS, INC. | ns2.bigserver.net | Blocked |
| 3 | 68.124.97.000 To 68.124.97.255 | BIG DOMS, INC. | 67.134.92.141 (Add) | MORE DOMS, INC. | ns1.phishy.net | Allowed |

GENERATING PHARMING ALERTS WITH REDUCED FALSE POSITIVES

BACKGROUND

"Pharming" is a type of cyber-attack that redirects Internet users to fraudulent websites that mimic the appearance of legitimate ones, in order illicitly to obtain login credentials and/or other protected information. Pharming often involves attacks on DNS (Directory Name System) servers on the Internet. DNS servers store associations between Internet hostnames and corresponding IP (Internet Protocol) addresses. Programs such as web browsers on user computers access DNS servers to resolve hostnames to corresponding IP addresses. When a user attempts to visit a website, e.g., by clicking a link or entering a hostname for the site in a field of a web browser, the user's computer may contact one or more DNS servers on the Internet to obtain the IP address for the site and then contact the site via its IP address to access the site's content.

Pharming attacks on DNS servers attempt to replace IP addresses of legitimate websites with those of fraudulent ones. By changing an IP address on a DNS server to that of a bogus site, a pharming hacker can redirect literally thousands of users to the bogus site. Compromised DNS servers are commonly referred to as "poisoned." Users may think they are going to a legitimate site, but the users are instead directed to the bogus site, which may resemble the legitimate site and may extract protected information from users under the guise of legitimacy.

Security services have been developed to discover and prevent pharming attacks. These services query DNS servers on the Internet and compare IP addresses for particular hostnames with known-valid IP addresses for those hostnames. If an IP address for a site obtained from a DNS server does not match the known-valid IP address for that site, the security service generates an alert to inform an operator of the site that a pharming attack may be underway.

SUMMARY

Unfortunately, security services for discovering pharming attacks tend to produce a high rate of false positive alerts. Contributing to the high false positive rate is the fact that websites often change the IP addresses of their hostnames frequently and without warning. Also, new IP addresses are brought online at a high rate as new subdomains and website features are introduced.

The high false positive rate of pharming alerts undermines security because site operators tend to ignore the alerts after a time or simply cannot keep up with them. False positive alerts are common whereas genuine pharming attacks are rare. To improve security and to ensure that genuine pharming attacks are recognized, what is needed is a more selective way of alerting site operators of potential pharming attacks.

In contrast with the prior approach, which generates false positive alerts at a high rate, an improved technique for informing an Internet site operator of potential pharming attacks includes generating pharming alerts based on mismatches between a set of expected IP addresses and IP addresses obtained from DNS servers on the Internet and filtering the generated alerts based on circumstances surrounding the generated pharming alerts. Filtering the alerts blocks less suspect pharming alerts while allowing more suspect ones to pass to the site operator, thus reducing the rate of false positives and better enabling the operator to focus on alerts that are more likely to present actual threats.

Certain embodiments are directed to a method of alerting operators of Internet sites of potential pharming attacks. The method includes generating pharming alerts in response to detecting mismatches between a set of expected IP (Internet Protocol) addresses of an Internet site and a set of IP addresses for the Internet site obtained by querying multiple DNS (Directory Name System) servers on the Internet. The method further includes filtering the generated pharming alerts based on a set of circumstances that surround the generated pharming alerts to produce a blocked set of pharming alerts and an allowed set of pharming alerts, and sending the allowed set of pharming alerts to an operator of the Internet site to warn the operator of potential pharming attacks.

Other embodiments are directed to a server constructed and arranged to perform the method described above. Still other embodiments are directed to a computer program product. The computer program product stores instructions, which when executed on one or more processing units of a server, cause the server to perform the method described above. Some embodiments involve activity that is performed at a single location, while other embodiments involve activity that is distributed over a computerized environment (e.g., over a network).

BRIEF DESCRIPTION OF THE SEVERAL VIEWS OF THE DRAWINGS

The foregoing and other features and advantages will be apparent from the following description of particular embodiments of the invention, as illustrated in the accompanying drawings, in which like reference characters refer to the same parts throughout the different views. In the accompanying drawings.

FIG. 4 is a screen shot of an example alert digest that may be generated by the example anti-fraud server of FIGS. 1 and 2 and received by a site operator.

DETAILED DESCRIPTION OF THE INVENTION

Embodiments of the invention will now be described. It is understood that such embodiments are provided by way of example to illustrate various features and principles of the invention, and that the invention hereof is broader than the specific example embodiments disclosed.

An improved technique for informing an Internet site operator of potential pharming attacks includes generating pharming alerts based on mismatches between a set of expected IP addresses and IP addresses obtained from DNS servers on the Internet and filtering the generated alerts based on circumstances surrounding the generated pharming alerts.

Figure 1:
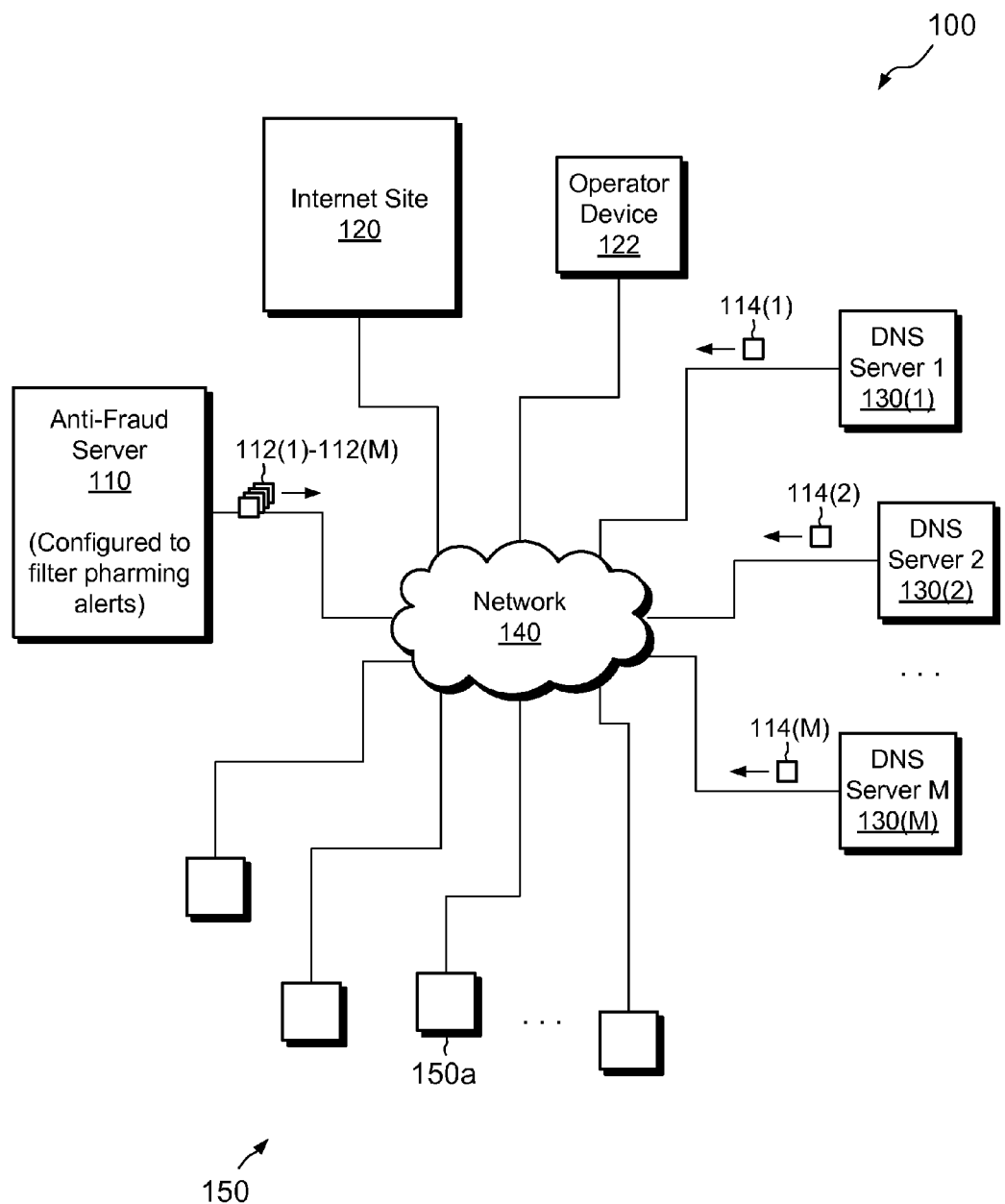
FIG. 1 is block diagram of an example environment in which embodiments of the improved technique hereof may be practiced.

FIG. 1 shows an example environment 100 in which embodiments of the improved technique hereof can be practiced. Here, an anti-fraud server 110, which is configured to generate and filter pharming alerts, is connected to a computer network 140, such as the Internet. Also connected to the network 140 are an Internet site 120, an operator device 122 (i.e., a computing device of an operator of the Internet site 120), multiple DNS servers 130(1) to 130(M), and various user machines 150.

In example operation, the anti-fraud server 110 checks for potential pharming activities directed to the Internet site 120 and alerts the operator device 122 of any high risk pharming activities that are suspected. Pharming activities can occur, for example, if a user of any of the user machines 150, such as a user of machine 150a, manages to break into any of the DNS servers 130(1) to 130(M) and change an IP address stored on the DNS server from a legitimate one to one that points to a bogus (fraudulent) site.

In an example, the anti-fraud server 110 sends queries 112(1) to 112(M) to the DNS servers 130(1) to 130(M), respectively, supplying a hostname of the Internet site 120 with each query and requesting that each DNS server answer by returning the IP address that the respective DNS server stores in connection with the supplied hostname. The DNS servers 130(1) to 130(M) respectively return IP addresses 114(1) to 114(M) in response to the queries. Each of the DNS servers 130(1) to 130(M) may return additional information, such as the name of the DNS server, for example. The anti-fraud server 110 receives the IP addresses 114(1) to 114(M) from the DNS servers and checks the received IP addresses against a set of expected IP addresses. The set of expected IP addresses are maintained in a whitelist stored on the anti-fraud server 110. In some examples, the whitelist stores the set of expected IP addresses for a particular hostname as individual, distinct addresses. In other examples, the whitelist stores expected IP addresses in the form of one or more allowable ranges of contiguous IP addresses, or as some combination of ranges and distinct values. If each of the returned IP addresses 114(1) to 114(M) matches with any of the expected IP addresses in the whitelist (for IP addresses listed individually) or falls within one of the allowable ranges of IP addresses (for IP addresses listed in ranges), then the anti-fraud server 110 detects no mismatches and thus generates no alerts, as all returned IP addresses 114(1) to 114(M) match expected values. However, if the anti-fraud server 110 detects any mismatches between returned IP addresses 114(1) to 114(M) and the set of expected IP addresses stored in the whitelist (i.e., if any of the returned IP addresses fails to match any expected individual IP address or fall within any expected range), the anti-fraud server 110 generates a pharming alert.

The anti-fraud server 110 subjects each generated pharming alert to a filtering process to determine whether to block the pharming alert or to allow the pharming alert to proceed to the operator device 122. The filtering process blocks or allows pharming alerts based on a set of circumstances that surround the generated pharming alert. These circumstances include, for example, the number of DNS servers that return IP addresses that result in mismatches (i.e., that are not found in the whitelist) and the returned IP addresses themselves that result in mismatches. Other circumstances may be included, as well, such as the time of day, the geographic location of any DNS server from which a mismatched IP address was returned, and hosting companies. In an example, the anti-fraud server 110 performs queries (e.g., "WHOIS" queries) to identify the hosting company that operates hosts at any or all of the returned IP addresses 114(1) to 114(M) and to identify the hosting companies that operate the IP addresses stored in the whitelist. The anti-fraud server 110 can then compare the hosting companies of returned IP addresses with those of IP addresses stored in the whitelist to provide additional input to the filtering process.

In some examples, the filtering process subjects the pharming alert to a risk-based analysis. For example, an expert system (or a human expert) receives the above-described circumstances as risk factors and computes an overall risk score associated with the pharming alert. The anti-fraud server 110 then compares the risk score with a predetermined threshold level. If the risk score falls below the threshold level, the anti-fraud server 110 blocks the pharming alert. The operator is not immediately informed of the alert and thus does not receive a message, which is likely to be a false positive. If the risk score exceeds the threshold level, however, the anti-fraud server 110 allows the pharming alert to advance and promptly dispatches the pharming alert to the site operator. For example, the anti-fraud server 110 sends an email, a text message, and/or some other transmission to the operator of the operator device 122 to inform the operator that the alert occurred and to list the circumstances under which the alert was generated. The operator thus receives the alert only if the risk-based analysis determines that the alert is severe enough to warrant the operator's attention. The operator may read the alert and take appropriate action.

In some examples, it is the operator of the Internet site 120 who establishes the threshold level against which the risk score is compared based on a risk tolerance of the Internet site to pharming attacks. Some Internet sites, such as banking sites, may have very low risk tolerance to pharming attacks, whereas other Internet sites, such as online gaming sites, may have higher risk tolerance to such attacks. Accordingly, the operator may set the threshold level to a low value if the Internet site 120 has low risk tolerance, in which case the operator will likely receive a relatively large number of pharming alerts (including many false positives—although, fewer than without filtering). However, the operator may also set the threshold level to a high value if the Internet site 120 has higher risk tolerance, in which case the operator will be likely to receive a relatively small number of pharming alerts (with fewer false positives), with any pharming alerts sent being those which the risk-based analysis deems highly suspect and thus more likely to be genuine. The threshold level may be set with a coarse level of granularity (e.g., by specifying "low," "medium," or "high" levels) or with finer granularity, such as with a numerical value that ranges from one to one hundred, for example.

Rather than using risk-based analysis to filter pharming alerts, the anti-fraud server 110 may instead employ a rules-based filtering technique. For example, the anti-fraud server 110 may test the circumstances surrounding each generated pharming alert using a series of conditional statements to determine whether to allow or block the pharming alert. The anti-fraud server 110 may employ still other analysis techniques, such as Beyesian filtering, fuzzy logic, neural nets, human experts, and/or other techniques, in determining whether to allow or block alerts. The filtering technique that is used is preferably tuned and tailored based on input from the operator of the Internet site 120, so that the filtering technique properly reflects the risk tolerance of the Internet site 120.

It should be understood that the particular arrangement of FIG. 1 is merely illustrative. For example, although the anti-fraud server 110 is shown as a single block, the anti-fraud server 110 may be implemented using any number of servers and/or physical computers or computing machines, which operate together to perform the described functions. The DNS servers 130(1) to 130(M) can be arranged in a DNS hierarchy, in no particular DNS hierarchy, or as a combination of hierarchically arranged servers and non-hierarchically arranged servers. The network 140 may be the Internet, as described, or may be some other network, such as a wide-area network, local area network, or combination of networks. The network 140 may include wired networks, wireless networks, cell phone networks, microwave networks, cable television networks, and so forth, in any combination.

Also, although it is shown that the anti-fraud server 110 generates pharming alerts directed to the Internet site 120, it is understood that the anti-fraud server 110 may operate on behalf of any number of different Internet sites, may send alerts to respective operators of such sites, and may allow the operators of such sites to establish respective risk threshold levels for the sites. The operator may be any person or entity associated with the Internet site 120, such as a security officer, system administrator, employee, consultant, or agent, for example, who works for the organization that runs the Internet site 120. The operator may also itself be a computerized system controlled by the Internet site 120, which receives pharming alerts as electronic transmissions and responds to the alerts automatically or semi-automatically.

Figure 2:
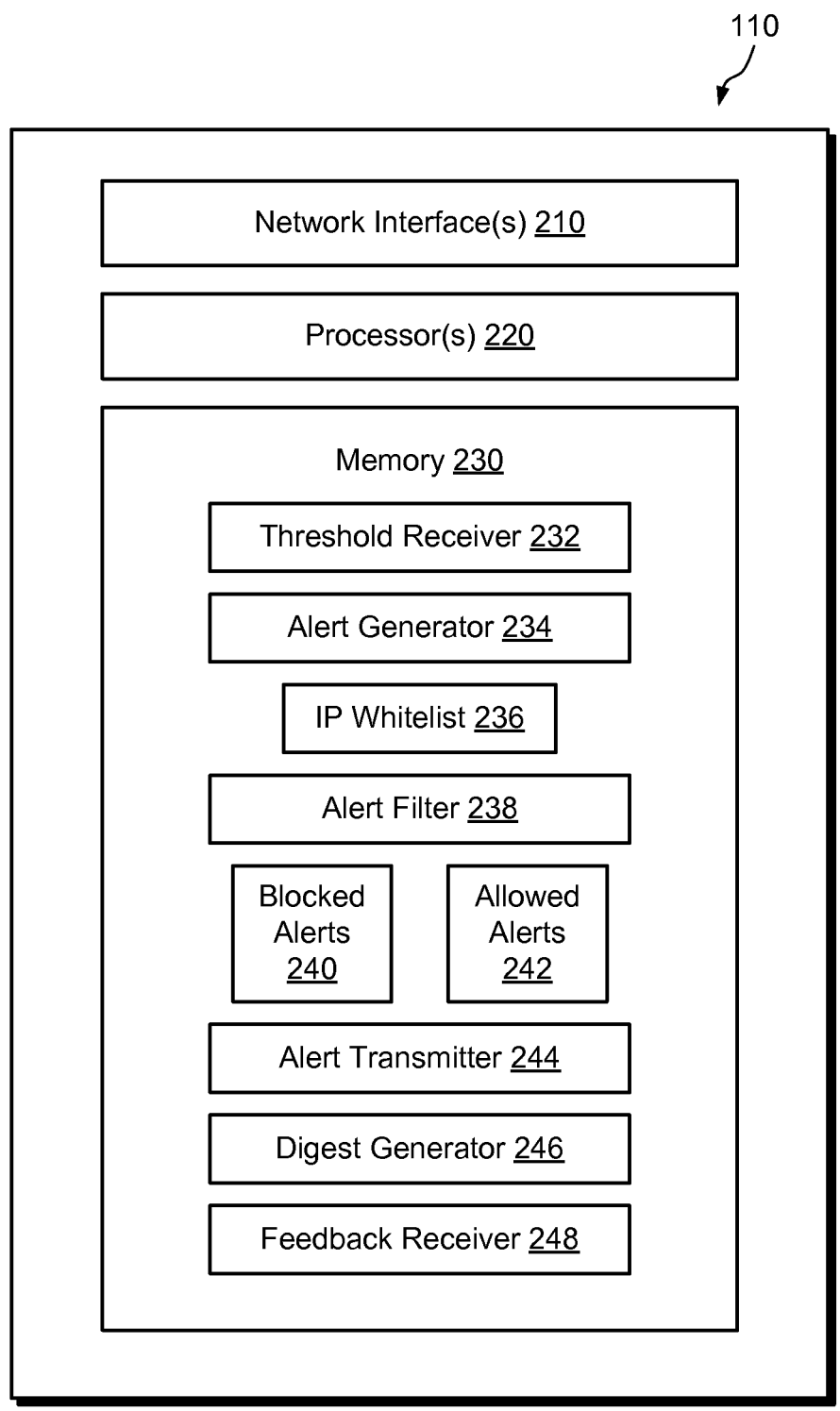
FIG. 2 is a block diagram of an example anti-fraud server as shown in FIG. 1.

FIG. 2 shows an example anti-fraud server 110 in additional detail. As shown, the anti-fraud server 110 includes one or more network interfaces 210, e.g., one or more Ethernet cards and/or Token Ring cards, a set of processors 220 (i.e., one or more processing chips and/or assemblies), and memory 230. The memory 230 includes both volatile memory (e.g., RAM) and non-volatile memory, such as one or more disk drives, solid state drives, and the like. The set of processors 220 and the memory 230 together realize control circuitry, which is constructed and arranged to carry out various methods and functions as described herein. Also, the memory 230 includes a variety of software constructs realized in the form of executable instructions. When the executable instructions are run by the set of processors 220, the set of processors 220 are caused to carry out the operations of the software constructs. Although certain software constructs are specifically shown and described, it is understood that the memory 230 typically includes many other software constructs, which are not shown, such as an operating system and various applications, processes, and daemons.

As further shown in FIG. 2, the memory 230 includes a threshold receiver 232, an alert generator 234, and an IP whitelist 236. The threshold receiver 232 receives a value of the above-described threshold level, e.g., from the operator of the Internet site 120, or more generally may receive values of threshold levels from operators of different Internet sites. The alert generator 234 generates pharming alerts using the technique described above, i.e., by querying DNS servers for IP addresses in connection with a particular hostname (or multiple host names) and checking whether the IP addresses received from the DNS servers are represented in the IP whitelist 236. The IP whitelist 236 may represent IP addresses individually and/or by providing one or more ranges of contiguous IP addresses, for example. The alert generator 234 generates a respective pharming alert for each IP address received from a DNS server that is not found in the IP whitelist 236.

The alert filter 238 filters pharming alerts produced by the alert generator 234 using any of the above-described techniques, e.g., risk-based analysis, rules-based filtering, Beyesian filtering, fuzzy logic, neural nets, human experts, and/or other techniques. The alert filter 238 assigns blocked pharming alerts to a blocked alerts list 240 and assigns allowed pharming alerts to an allowed alerts list 242. In some examples, the anti-fraud server 110 stores the lists 240 and 242 separately, e.g., in different files. In other examples, the anti-fraud server 110 stores the lists 240 and 242 together (e.g., in a single file) and each pharming alert is assigned a tag or field value that indicates whether it is blocked or allowed.

An alert transmitter 244 sends each pharming alert in the allowed alerts list 242 to the operator of the Internet site 120 (or to operators of respective sites) as described above, i.e., using an email, text message, and/or other transmission medium. In some examples, the alert transmitter 244 sends allowed pharming alerts to the operator in real time as the alerts are detected and filtered, so that the operator is informed of the alerts at the earliest possible time. In other examples, and particularly when the Internet site has a high risk tolerance to pharming attacks, alerts may be accumulated over the course of multiple instances of querying multiple DNS servers. The alert filter 238 performs additional analysis on the accumulated alerts to intelligently filter the alerts based on a large accumulated data set. Analyzing alerts accumulated over time can reveal patterns that allow the false positive rate to be further reduced, although at the expense of providing a fast response.

As further shown in FIG. 2, the anti-fraud server 110 includes a digest generator 246 and a feedback receiver 248. The digest generator 246 produces a digest of pharming alerts accumulated over a specified period of time, such as a day, a week, a month, and so forth, and sends each digest to the operator of the Internet site 120. Each digest provides a summary of all alerts detected over the specified period of time, regardless of whether the alerts were initially blocked or allowed when they occurred. For each listed alert, the digest may provide any information available, such as the received IP address that gave rise to the alert, the name of the DNS server from which the IP address was received, and the hosting company that operates the host at the received IP address.

In an example, each digest lists both alerts that were sent to the operator as soon as they were detected and filtered and alerts that were blocked. As the alert filter 238 operates in part based on input from the operator to reflect the risk tolerance of the Internet site 120, the digest gives the operator an opportunity to monitor how well the alert filter 238 is working and to make adjustments if necessary. For example, the operator may adjust the threshold level used for performing risk-based analysis. The operator may also provide feedback in connection with particular alerts. For example, the feedback receiver 248 can receive feedback from the operator to add IP addresses listed in the digest to the IP whitelist 236, e.g., if the operator knows that the IP addresses which generated such alerts are legitimate.

Figure 3:
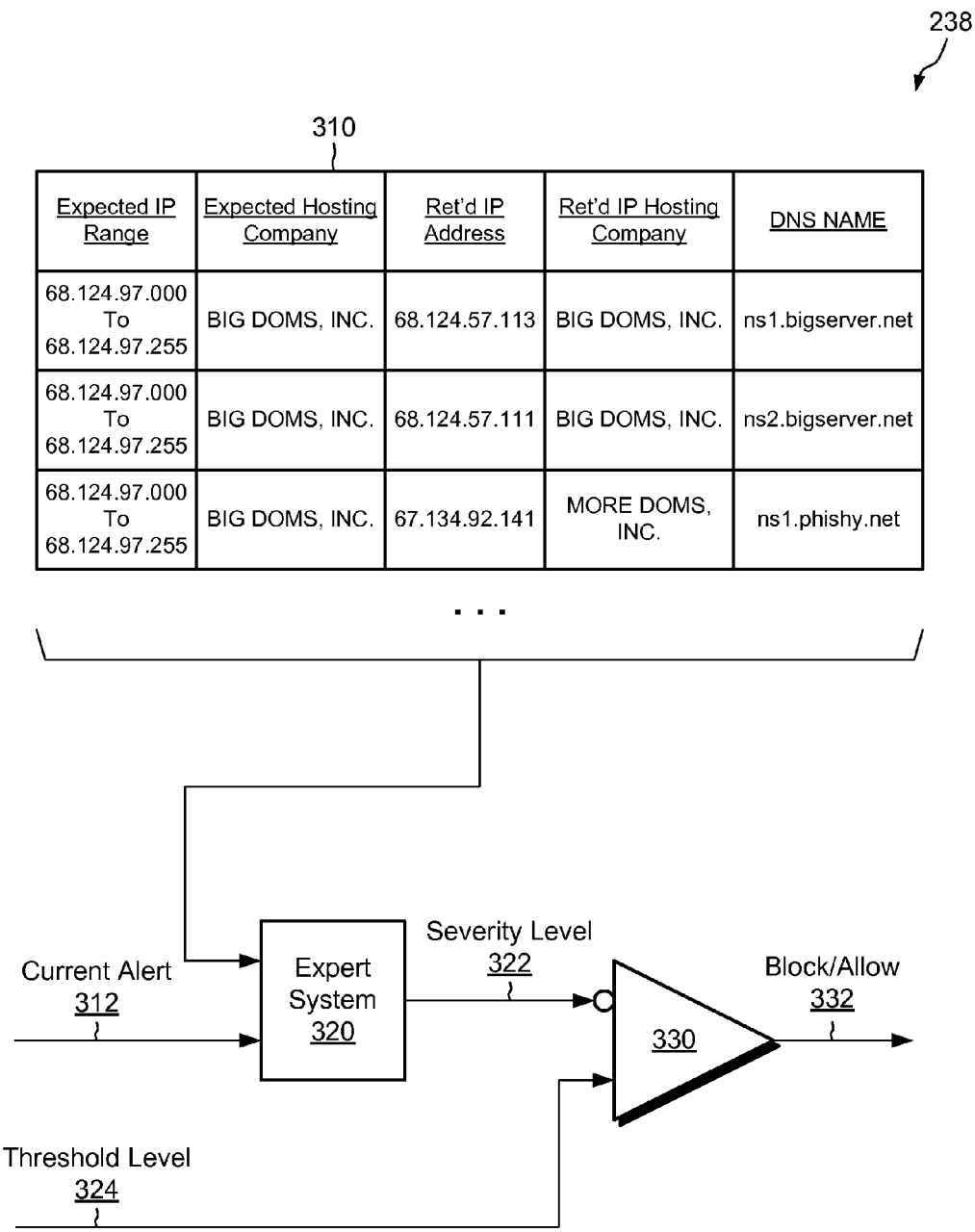
FIG. 3 is a block diagram of an example alert filter of the example anti-fraud server of FIG. 2.

FIG. 3 shows an example alert filter 238 in additional detail. Here, the alert filter 238 is arranged to perform risk-based analysis. As shown, an expert system 320 receives a current alert 312, i.e., a pharming alert that the alert generator 246 has produced. The expert system 320 also receives a table of alerts 310, i.e., a list of pharming alerts and information that accompanies them. For example, the table 310 provides, for each pharming alert raised in response to querying a set of DNS servers (e.g. the DNS servers 130(1) to 130(M)), an expected IP address range (from the whitelist 236), the name of the hosting company that operates the IP addresses in the expected IP address range, an IP address returned from a DNS server, the name of the hosting company that operates the host at the returned IP address, and the name of the DNS server. Together, the information in the table 310 describes an example set of circumstances that surround the pharming alert 312. The expert system 320 processes the information from the table 310 to produce a severity level 322, i.e., a numerical representation of the computed severity of the threat posed by the pharming alert 312. Comparison block 330 compares the severity level 322 with a threshold level 324, e.g., the threshold level obtained from the operator and based on the risk tolerance of the Internet site 120. The comparison block 330 produces an output 332 based on the relative values of the severity level 322 and the threshold level 324. If the severity level 322 exceeds the threshold level 324, the output 332 allows the current alert 312 to pass to the alert transmitter 244 and on to the operator. The output 332 also directs the current alert 312 to be assigned to the list of allowed alerts 242. If the severity level 322 falls below the threshold level 324, however, the output 332 blocks the current alert 312 and directs the current alert 312 to be assigned to the list of blocked alerts 240.

The alert filter 238, regardless of whether it is implemented using risk-based analysis or some other technique, may balance a broad range of information in determining whether to block or allow the current pharming alert 312. However, certain factors may strongly suggest that an alert should be treated one way or the other. For example, it has been observed that DNS servers are generally highly resistant to hacking, such that it would be unlikely for a single pharming hacker to successfully break into a large number of different DNS servers. Thus, if queries to multiple DNS servers reveal many mismatches in the returned IP addresses, then it is highly likely that the mismatches are caused by something other than a pharming attack. Therefore, and perhaps counterintuitively, the greater the number of DNS servers that return mismatching IP addresses, the lower the chances that a pharming attack is underway. Thus, for example, the expert system 320 may compute a low severity level 322 for a current alert 312 and may tend to block the alert 312 if the table 310 shows many mismatching IP addresses. This is particularly the case if all mismatching IP addresses are the same. Conversely, if only a single IP address returned from all the DNS servers gives rise to a mismatch, chances are higher that a genuine pharming attack is underway. Thus, for example, the expert system 320 computes a high severity level 322 when only a single mismatch is detected and tends to allow the alert to propagate to the operator. In one particular example, detecting one, two, or three mismatches in IP addresses returned from the DNS servers results in the severity level 322 being set to a high value and the current alert 312 being allowed to advance to the operator. In some examples, detecting greater than some upper limit of mismatches results in the severity level 322 being set to a low value and the current alert 312 being blocked. The upper limit in some examples may be as low as a single mismatch.

The identities of hosting companies of IP addresses also have a strong bearing on how pharming alerts should be treated. Although little suspicion might be raised when a site is moved to a new IP address if the new address is operated by the same company that operated the previous address, much more suspicion might be raised if the site were moved to a different hosting company. Thus, for example, if an IP address returned from a DNS server for the current alert 312 is hosted by a hosting company that differs from the one that hosts the IP address in the whitelist, then pharming is strongly suspected. The expert system 320 may thus compute a high severity level 322 for the current alert 312 and may tend to allow the alert 312 to propagate forward if the returned hosting company is different from the expected hosting company. Conversely, if the two hosting companies for the current alert 312 match, chances are lower of an actual attack, as the current hosting company may simply have moved the site to a different IP address.

FIG. 4 shows an example digest 410 produced by the digest generator 246 of the anti-fraud server 110. The anti-fraud server 110 may send digests like the digest 410 to the operator of the Internet site 120 by email or other means on daily, monthly, or other intervals, to list all alerts that the anti-fraud server 110 has generated for the hostname of the Internet site since it sent the previous digest. To facilitate understanding, the digest 410 is seen to include the same alerts as those shown in FIG. 3; however, the digest 410 typically includes alerts resulting from many iterations of querying multiple DNS servers over the designated time interval. In an example, the digest 410 lists the same information as is shown in the table 310 (FIG. 3), but may also provide, for each alert, an alert number as well as an indication of whether the alert was allowed or blocked. Thus, the digest 410 allows the operator to see not only alerts already sent to the operator as they were detected, but also alerts that were blocked. The operator can thus assess how well the currently implemented filtering technique is working and may request adjustments, such as changing the threshold level 324.

In an example, the digest 410 includes controls, such as buttons 420, to add displayed IP addresses to the whitelist 236. For example, the digest generator 246 may render the digest 410 as one or more HTML forms that include the buttons 420. When the operator clicks a button 420, a form sends the IP address displayed adjacent to the clicked button to the anti-fraud server 110 and directs the feedback receiver 248 (FIG. 2) to add the displayed IP address to the whitelist 236. Although the operator may not be required to review the digest 410 or to add IP addresses to the whitelist 236 by clicking buttons 420, doing so may help to further reduce the number of false positives generated by the anti-fraud server 110 going forward.

Figure 5:
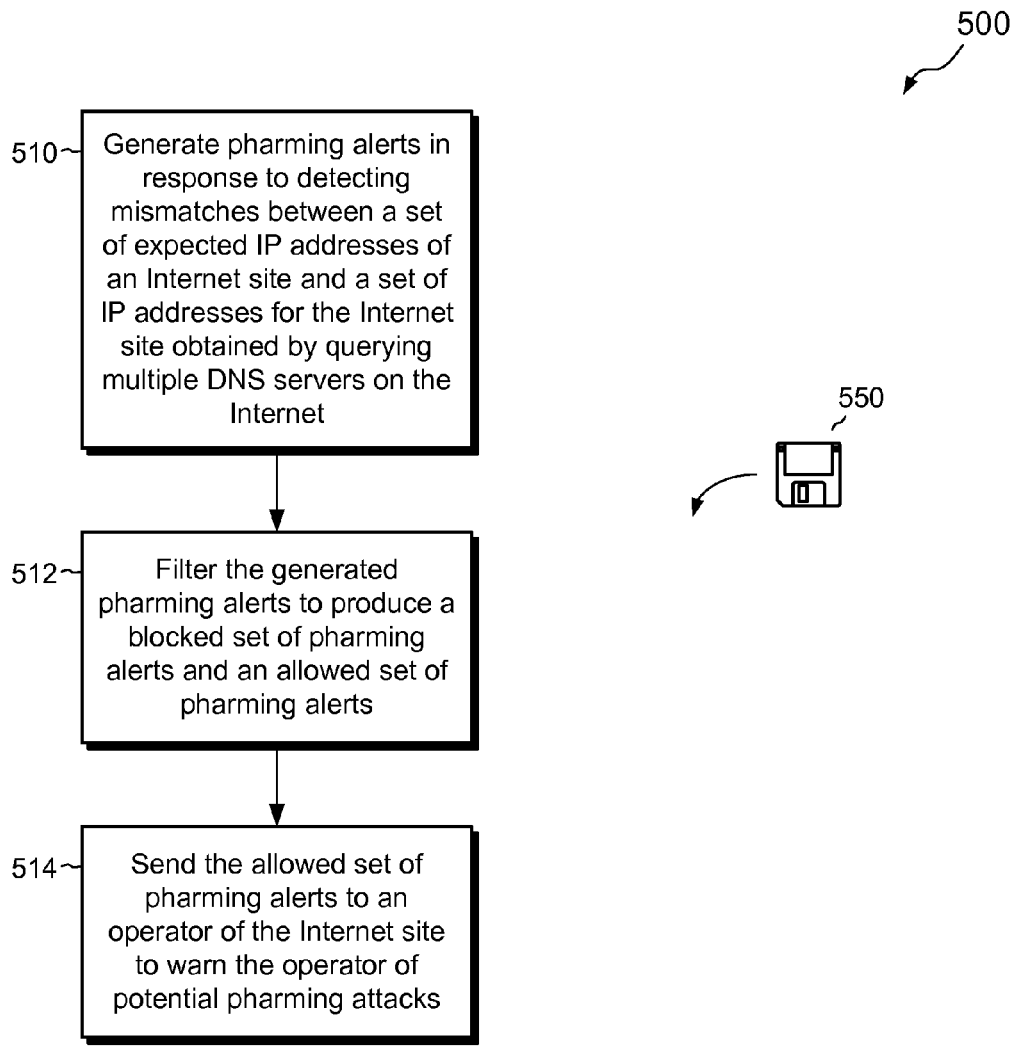
FIG. 5 is a flowchart showing an example process for alerting operators of Internet sites of potential pharming attacks.

FIG. 5 shows a process 500 for alerting operators of Internet sites of potential pharming attacks. The process 500 may be carried out in connection with the anti-fraud server 110 and is typically performed by the software constructs described in connection with FIG. 2, which reside in the memory 230 of the anti-fraud server 110 and are run by the set of processors 220. The various acts of the process 500 may be ordered in any suitable way. Accordingly, embodiments may be constructed in which acts are performed in orders different from that illustrated, which may include performing some acts simultaneously, even though the acts are shown as sequential in the illustrated embodiments.

At step 510, pharming alerts are generated in response to detecting mismatches between a set of expected IP addresses of an Internet site and a set of IP addresses for the Internet site obtained by querying multiple DNS servers on the Internet. For example, the alert generator 234 on the anti-fraud server 110 generates pharming alerts in response to detecting mismatches between a set of IP addresses stored in a whitelist 236 and IP addresses 114(1) to 114(M) obtained by querying DNS servers 130(1) to 130(M).

At step 512, the generated pharming alerts are filtered based on a set of circumstances that surround the generated pharming alerts to produce a blocked set of pharming alerts and an allowed set of pharming alerts. For example, the alert filter 238 (FIG. 2) filters the pharming alerts produced by the alert generator 234 based on circumstances listed in or derived from the table 310 (FIG. 3). The alert filter 238 may operate using various analysis techniques, including, for example, risk-based analysis, to assign each current pharming alert 312 either to a blocked set of alerts 240 (FIG. 2) or to an allowed set of alerts 242.

At step 514, the allowed set of pharming alerts are sent to an operator of the Internet site to warn the operator of potential pharming attacks. For example, the alert transmitter 244 sends each allowed pharming alert to the operator machine 122 via an email, text message, or other transmission.

An improved technique has been described for informing an Internet site operator of potential pharming attacks. The technique includes generating pharming alerts based on mismatches between a set of expected IP addresses (e.g., stored in a whitelist 236) and IP addresses (e.g., 114(1) to 114(M)) obtained from DNS servers (e.g., 130(1) to 130 (M)) on the Internet and filtering the generated alerts based on circumstances surrounding the generated pharming alerts. Filtering the alerts blocks less suspect pharming alerts while allowing more suspect ones to pass to the site operator, reducing the rate of false positives and better enabling the operator to focus on alerts that may present actual threats.

Having described certain embodiments, numerous alternative embodiments or variations can be made. For example, the improvement or portions thereof may be embodied as a non-transient computer-readable storage medium, such as a magnetic disk, magnetic tape, compact disk, DVD, optical disk, flash memory, Application Specific Integrated Circuit (ASIC), Field Programmable Gate Array (FPGA), and the like (shown by way of example as medium 550 in FIG. 5). Multiple computer-readable media may be used. The medium (or media) may be encoded with instructions which, when executed on a set of processors, perform methods that implement the various processes described herein. Such medium (or media) may be considered an article of manufacture or a machine, and may be transportable from one machine to another.

Further, although features are shown and described with reference to particular embodiments hereof, such features may be included and hereby are included in any of the disclosed embodiments and their variants. Thus, it is understood that features disclosed in connection with any embodiment are included as variants of any other embodiment.

As used throughout this document, the words "comprising," "including," and "having" are intended to set forth certain items, steps, elements, or aspects of something in an open-ended fashion. Also, as used herein and unless a specific statement is made to the contrary, the word "set" means one or more of something. Although certain embodiments are disclosed herein, it is understood that these are provided by way of example only and the invention is not limited to these particular embodiments.

Those skilled in the art will therefore understand that various changes in form and detail may be made to the embodiments disclosed herein without departing from the scope of the invention.

What is claimed is:

1. A method of alerting operators of Internet sites of potential pharming attacks, comprising:
   generating pharming alerts in response to detecting mismatches between a set of expected IP (Internet Protocol) addresses of an Internet site and a set of IP addresses for the Internet site obtained by querying multiple DNS (Directory Name System) servers on the Internet;
   filtering the generated pharming alerts based on a set of circumstances that surround the generated pharming alerts to produce a blocked set of pharming alerts and an allowed set of pharming alerts; and
   sending the allowed set of pharming alerts to an operator of the Internet site to warn the operator of potential pharming attacks,
   wherein filtering the generated pharming alerts includes, for a current pharming alert of the generated pharming alerts:
      assigning a severity level to the current pharming alert based on a set of circumstances that surround the current pharming alert;
      comparing the assigned severity level of the current pharming alert with a threshold level; and
      assigning the current pharming alert to one of the blocked set of pharming alerts and the allowed set of pharming alerts based on whether the assigned severity level of the current pharming alert falls below or exceeds the threshold level, respectively, and
   wherein the method further comprises receiving input from the operator of the Internet site for establishing the threshold level based on a risk tolerance of the Internet site to pharming attacks, such that comparing the assigned severity level of the current pharming alert with the threshold level evaluates the current pharming alert based on the input received from the operator.

2. A method as recited in claim 1, wherein the set of expected IP addresses of the Internet site includes an IP address range spanning multiple contiguous IP addresses, and wherein generating the pharming alerts includes generating a respective pharming alert for each IP address obtained by querying the DNS servers that falls outside the IP address range.

3. A method as recited in claim 2, wherein assigning a severity level to the current pharming alert includes assigning a low severity level to the current pharming alert in response to detecting mismatches for greater than one of the IP addresses obtained from the DNS servers.

4. A method as recited in claim 2, wherein the set of expected IP addresses of the Internet site are operated by a first hosting company, wherein the method further comprises identifying a current hosting company that operates the IP address from the DNS servers that gave rise to the current pharming alert, and wherein assigning a severity level to the current pharming alert includes assigning a low severity level in response to the current hosting company being the same as the first hosting company.

5. A method as recited in claim 2, wherein the set of expected IP addresses of the Internet site are operated by a first hosting company, wherein the method further comprises identifying a current hosting company that operates the IP address from the DNS servers that gave rise to the current pharming alert, and wherein assigning a severity level to the current pharming alert includes assigning a high severity level in response to the current hosting company differing from the first hosting company.

6. A method as recited in claim 2, wherein assigning a severity level to each of the pharming alerts includes assigning a high severity level to a pharming alert in response to detecting mismatches in one, two, or three of the IP addresses obtained from the DNS servers.

7. A method as recited in claim 2, wherein filtering the generated pharming alerts includes assigning pharming alerts to the allowed set of pharming alerts in response to detecting mismatches for greater than one of the IP addresses obtained from the DNS servers.

8. A method as recited in claim 2, wherein the set of expected IP addresses of the Internet site are operated by a hosting company, and wherein filtering the generated pharming alerts includes assigning pharming alerts to the blocked set of pharming alerts in response to confirming that the IP addresses obtained from the DNS servers that result in pharming alerts are operated by the same hosting company that operates the set of expected IP addresses.

9. A method as recited in claim 2, further comprising receiving feedback from the operator of the Internet site to add selected ones of the IP addresses received from the DNS servers to the set of expected IP addresses.

10. A method as recited in claim 2, further comprising:
compiling pharming alerts accumulated over a specified time interval into a digest that includes pharming alerts from both the blocked set of pharming alerts and the allowed set of pharming alerts; and
sending the digest to the operator of the Internet site after the specified time interval has expired,
wherein the digest lists, for each of at least some of the pharming alerts, (i) the IP address that gave rise to the pharming alert, (ii) the name of the DNS server from which the IP address that gave rise to the pharming alert was obtained, and (iii) the hosting company that operates the IP address that gave rise to the pharming alert.

11. A method as recited in claim 10, wherein compiling the pharming alerts into the digest includes providing a form element in connection with at least some of the IP addresses listed in the digest to enable the operator of the Internet site to selectively add any of such IP addresses to the set of allowable IP addresses for the Internet site.

12. A server for alerting operators of Internet sites of potential pharming attacks, the server comprising a set of processors coupled to memory, the memory storing executable instructions which, when executed by the set of processors, realize control circuitry constructed and arranged to:
generate pharming alerts in response to detecting mismatches between a set of expected IP addresses of an Internet site and a set of IP addresses for the Internet site obtained by querying multiple DNS servers on the Internet;
filter the generated pharming alerts based on a set of circumstances that surround the generated pharming alerts to produce a blocked set of pharming alerts and an allowed set of pharming alerts; and
send the allowed set of pharming alerts to an operator of the Internet site to warn the operator of potential pharming attacks,
wherein the control circuitry, constructed and arranged to filter the generated pharming alerts, is further constructed and arranged, for a current pharming alert of the generated pharming alerts, to:
assign a severity level to the current pharming alert based on a set of circumstances that surround the current pharming alert;
compare the assigned severity level of the current pharming alert with a threshold level; and
assign the current pharming alert to one of the blocked set of pharming alerts and the allowed set of pharming alerts based on whether the assigned severity level of the current pharming alert falls below or exceeds the threshold level, respectively, and
wherein the control circuitry is constructed and arranged to receive input from the operator of the Internet site for establishing the threshold level based on a risk tolerance of the Internet site to pharming attacks, such that comparing the assigned severity level of the current pharming alert with the threshold level evaluates the current pharming alert based on the input received from the operator.

13. A server as recited in claim 12, wherein the circumstances that surround each respective pharming alert include any of:
a number of DNS servers from which IP addresses are obtained that result in mismatches;
names of different hosting companies that operate the IP addresses obtained from the DNS servers; and
each IP address obtained from the DNS servers that result in a mismatch.

14. A non-transitory computer-readable medium including instructions which, when executed by a set of processors of a server, cause the set of processors to perform a method of alerting operators of Internet sites of potential pharming attacks, the method comprising:
generating pharming alerts in response to detecting mismatches between a set of expected IP addresses of an Internet site and a set of IP addresses for the Internet site obtained by querying multiple DNS servers on the Internet;
filtering the generated pharming alerts based on a set of circumstances that surround the generated pharming alerts to produce a blocked set of pharming alerts and an allowed set of pharming alerts; and
sending the allowed set of pharming alerts to an operator of the Internet site to warn the operator of potential pharming attacks,
wherein filtering the generated pharming alerts includes, for a current pharming alert of the generated pharming alerts:
assigning a severity level to the current pharming alert based on a set of circumstances that surround the current pharming alert;
comparing the assigned severity level of the current pharming alert with a threshold level; and
assigning the current pharming alert to one of the blocked set of pharming alerts and the allowed set of pharming alerts based on whether the assigned severity level of the current pharming alert falls below or exceeds the threshold level, respectively, and
wherein the method further comprises receiving input from the operator of the Internet site for establishing the threshold level based on a risk tolerance of the Internet site to pharming attacks, such that comparing the assigned severity level of the current pharming alert with the threshold level evaluates the current pharming alert based on the input received from the operator.

15. A non-transitory computer-readable medium as recited in claim 14, wherein assigning a severity level to each of the pharming alerts includes assigning a low severity level to one or the pharming alerts in response to detecting mismatches for greater than one of the IP addresses obtained from the DNS servers.

16. A method as recited in claim 1, wherein sending the allowed set of pharming alerts to the operator of the Internet site includes transmitting the allowed set of pharming alerts from the anti-fraud server to an operator device over a network.

17. A method as recited in claim 2, wherein filtering the generated pharming alerts includes (i) assigning relatively low severity levels to pharming alerts for which greater numbers of mismatches are detected in the IP addresses obtained from the DNS servers and (ii) assigning relatively high severity levels to pharming alerts for which lesser numbers of mismatches are detected in the IP addresses obtained from the DNS servers.

18. A method as recited in claim 1, wherein filtering the generated pharming alerts includes subjecting each generated pharming alert to a filtering process to determine whether to block that pharming alert or to allow that pharming alert to proceed to the operator of the Internet site.

19. A method as recited in claim 18, wherein, when filtering the generated pharming alerts, the set of circumstances that surround the generated pharming alerts includes at least one of (i) a time of day when a pharming alert is generated or (ii) a geographic location of a DNS server from which a mismatched IP address that gives rise to that pharming alert is returned.

* * * * *